No. 633,690. Patented Sept. 26, 1899.
A. FRANKE.
APPARATUS FOR REPRODUCING MOTION.
(Application filed Feb. 23, 1899.)
(No Model.)
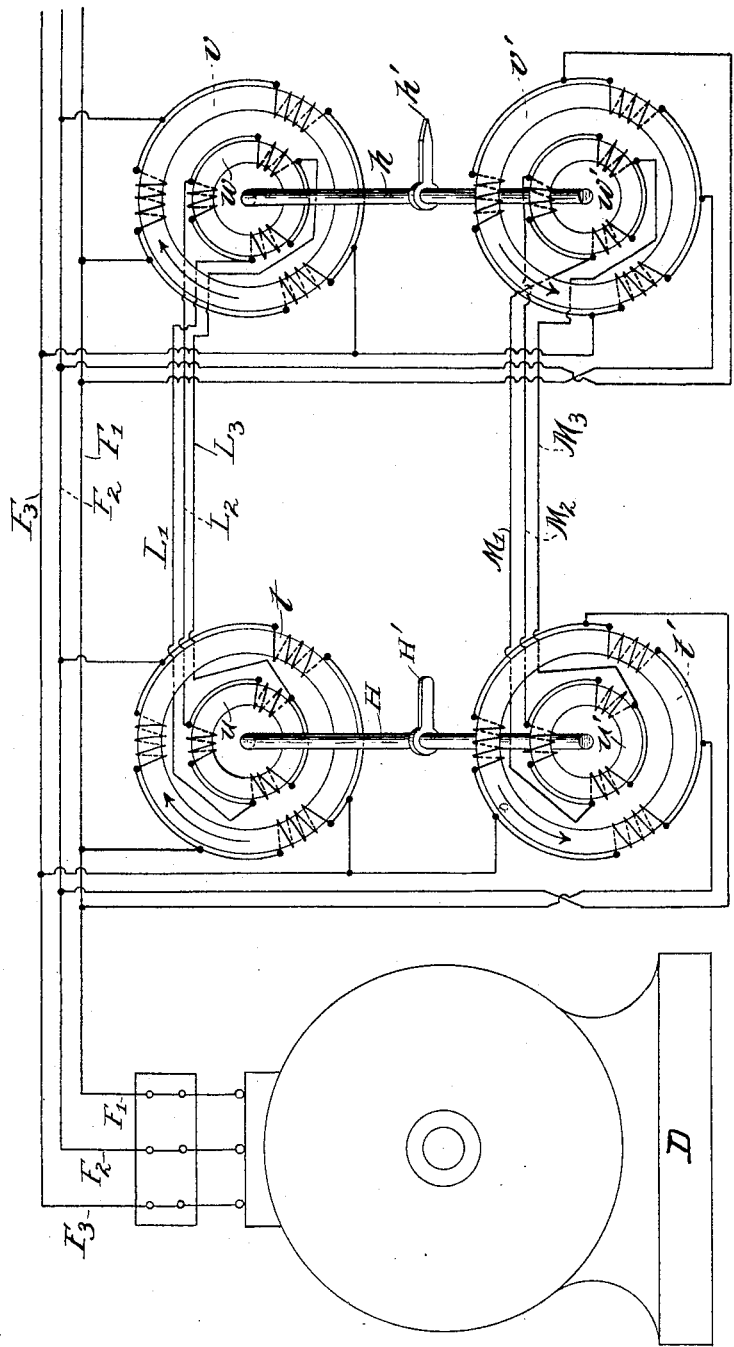
Witnesses:
George L. Cragg
D.W.C. Danner
Inventor
Adolf Franke,
By Parton & Mower
Attorneys.

UNITED STATES PATENT OFFICE.

ADOLF FRANKE, OF BERLIN, GERMANY, ASSIGNOR TO THE SIEMENS & HALSKE ELECTRIC COMPANY OF AMERICA, OF CHICAGO, ILLINOIS.

APPARATUS FOR REPRODUCING MOTION.

SPECIFICATION forming part of Letters Patent No. 633,690, dated September 26, 1899.

Application filed February 23, 1899. Serial No. 706,531. (No model.)

*To all whom it may concern:*

Be it known that I, ADOLF FRANKE, a subject of the German Emperor, residing at Berlin, Germany, have invented a certain new and useful Improvement in Apparatus for Reproducing Motion, (Case No. 182,) of which the following is a full, clear, concise, and exact description.

My invention relates to apparatus employed in reproducing motion occurring at one place at a distant place, my invention relating particularly to that class of apparatus in which transmitting mechanism and receiving mechanism are operated by multiphase currents.

Heretofore transmitting and receiving apparatus have been employed, the transmitter and receiver being in the nature of dynamo-electric machines each having a stationary member and a rotating member, the rotating members of the transmitter and receiver having a definite, relative, or a uniform movement. In apparatus of this character the motion or revolution of the movable members of the receiver and transmitter was either in the same direction with the rotating field set up in each or was in a direction opposite to that of the rotating field in each, according to the amount of force required to operate the movable members. Where the rotation of the movable members of the transmitter and receiver conforms in direction to that of the rotating fields, less energy is required than where the rotation of these movable members is opposite in direction to that of the rotating fields. In a system of synchronizing clocks, for example, in which a master-clock is employed, it is preferable to have the direction of rotation of the field conform to that of the hands of the master-clock in order to maintain at the receivers of the remaining clocks movements of the clock-hands without the expenditure of much energy in synchronizing the clocks. Where movements of great rapidity, for example, are to be reproduced, it is preferable to actuate the rotating element of the transmitter contrary to the direction of rotation of the field. Difficulties have arisen with the apparatus heretofore employed, however, where with the same transmitter movements of the rotating member thereof in both directions were to be reproduced at the receiver or receivers, since the work expended in rotating the movable member of the transmitter would vary in magnitude according to the direction of rotation of the movable member. Moreover, especially where the magnetization of the transmitter and receiver is feeble, the movable member of the receiver may under certain conditions rotate with the field beyond the desired distance.

My invention has for its object the provision of an improved form of apparatus whereby motion in either direction at a transmitter may be reproduced at a receiver or receivers, the organization being such that whether the power required be great or small or the movement rapid or slow the motion of the movable member of the transmitter will be accurately reproduced independent of the direction of motion of the movable member of the transmitter.

Generally speaking, my invention comprises in its preferred embodiment a transmitter having two stationary fields to which multiphase current is supplied, the connections being such that rotating fields in opposite directions are set up, an armature being disposed in each field, these armatures being mechanically coupled with each other and with the device whose motion is to be reproduced. Each receiver also comprises two electromotive devices, each having a stationary field-magnet whose windings are also preferably supplied from the same source that supplies the windings of the fields of the transmitter, the fields of the receiver also rotating in opposite directions. An armature is included in each of the latter fields, the armatures being mechanically coupled with each other and with the device in which the motion at the transmitter is to be reproduced. The armatures of the transmitters and receivers in the fields that rotate in the same direction are preferably electrically connected in such a manner that a rotating field is created in each by induction.

My invention will be more readily understood by reference to the accompanying drawing, which illustrates the preferred embodiment thereof.

The drawing illustrates a generator of multiphase current, a transmitter, and a receiver, all associated together in accordance with my invention.

A generator D of multiphase current is connected with the supply-mains F' F² F³, which extend to the transmitting and receiving stations. At the transmitting-station is located the device H', whose motions are to be reproduced in the device $h'$ at the receiving-station. The device H' is in this instance an arm which is adapted manually to be operated for any suitable purpose, which it is not necessary to specify, the motion of the arm H' being required to be reproduced in the arm $h'$ for any suitable purpose. The transmitter comprises two stationary fields $t\ t'$, each having in this instance three coils connected with the mains F' F² F³, the connections being such that, for example, the field in the magnet $t$ rotates in the direction indicated by the arrow and the field in the magnet $t'$ rotates in an opposite direction, as indicated by the arrow.

The device H', whose motion is to be reproduced, is attached to the shaft H, which mechanically couples the armatures $u\ u'$ in the fields, respectively, of the field-magnets $t\ t'$. The apparatus of the receiver is similar to that of the transmitter, the receiver having two field-magnets $v\ v'$, whose coils are connected with the supply-mains F' F² F³ in a manner to create rotating fields, the field in the magnet $v$ rotating, preferably, in the same direction as the field in the magnet $t$ of the transmitter, as indicated by the arrow. The field in the magnet $v'$ preferably rotates in an opposite direction, as indicated by the arrow. The device $h'$, in which the motion of the device H' is to be reproduced, is mechanically coupled with the shaft $h$, which shaft mechanically couples the armatures $w\ w'$, located, respectively, in inductive relation with the fields $v\ v'$. Each armature is preferably provided with a multiphase winding, the windings of the armatures $u$ and $w$ being electrically connected by cross-conductors L' L² L³, the armatures $u'\ w'$ being connected by the conductors M' M² M³. By this arrangement a rotating field is set up in the armatures of the receiver when the armatures of the transmitter are moved by the device H', so that the rotating field in each armature $w\ w'$ will coact with the fields in the magnets $v\ v'$ to reproduce the desired movement in the device $h'$.

In the claims I use the term "multiphase windings" in connection with the fields of the transmitter and receiver, meaning the field-coils and the necessary circuit connections thereof to produce rotating fields. In the system shown in the drawing, for example, the coils of the transmitter and receiver fields are provided with metallic connections with the supply-mains, these connections being such as to create oppositely-rotating fields in the transmitter and in the receiver, the connections forming parts of the windings of the fields in the sense in which I employ that term in the claims.

It is obvious that changes may be made in the preferred embodiment herein shown and particularly described, and I do not therefore desire to be limited to the precise construction shown; but,

Having thus described my invention, what I claim as new, and desire to secure by Letters Patent, is—

1. In a device of the character described, the combination with a transmitter having two sets of multiphase windings for producing oppositely-rotating fields in the transmitter, of a receiver having two sets of multiphase windings for producing oppositely-rotating fields therein, and electrically-associated armatures subjected to the influence of the fields of the transmitter and receiver, substantially as described.

2. In a device of the character described, the combination with a transmitter provided with two sets of multiphase windings adapted to create oppositely-rotating fields in the transmitter, of a receiver provided with two sets of multiphase windings adapted to produce oppositely-rotating fields therein, and electrically-connected armatures subjected to the action of the fields in the transmitter and receiver, substantially as described.

3. In a device of the character described, the combination with a transmitter provided with two sets of multiphase windings adapted to create in the transmitter oppositely-rotating fields, of mechanically-coupled armatures subjected to the influence of said fields; a receiver having two sets of multiphase windings adapted to create oppositely-rotating fields, and mechanically-coupled armatures subjected to the action of each of the latter fields, the armatures of the transmitter and receiver being electrically associated, substantially as described.

4. In a device of the character described, the combination with a transmitter, having two sets of multiphase windings adapted to create fields rotating in opposite directions; of an armature subjected to the influence of each of said fields, said armatures being mechanically coupled with each other and with the device whose movements are to be reproduced; a receiver having two sets of multiphase windings adapted to create fields rotating in opposite directions; and two armatures, one subjected to the action of each field of the receiver, the latter two armatures being mechanically coupled with each other and with the device in which the movements are to be reproduced, the respective armatures of the transmitter and receiver being electrically connected, substantially as described.

5. In a device of the character described, the combination with a transmitter having two sets of multiphase windings adapted to create fields rotating in opposite directions; of an armature subjected to the action of each of said fields, said armatures being mechanically coupled with each other and with the device whose movements are to be reproduced; a receiver having two sets of multiphase windings adapted to create fields rotating in opposite directions; and two armatures, each subjected to the influence of one of the latter two fields, the latter armatures being mechanically coupled with each other and with the device in which the movements are to be reproduced, each of the armatures of the transmitter and receiver being provided with a multiphase winding, the windings of those armatures subjected to the influence of the fields of the transmitter and receiver rotating in the same direction being electrically connected, substantially as described.

6. In a device of the character described, the combination with a transmitter having two sets of multiphase windings adapted to create fields rotating in opposite directions; of mechanically-coupled armatures subjected to the influence of each of said fields; a receiver having two sets of multiphase windings adapted to create fields rotating in opposite directions; and mechanically-coupled armatures subjected to the influence of the latter fields, the armatures of the receiver and transmitter being provided with multiphase windings, the windings of those armatures of the receiver and transmitter which are subjected to fields rotating in the same direction being electrically connected, substantially as described.

7. In a device of the character described, the combination with a transmitter having two sets of multiphase windings adapted to create fields rotating in opposite directions; of mechanically-coupled armatures subjected to the action of the said fields; a receiver having two sets of multiphase windings adapted to create fields rotating in opposite directions; and mechanically-coupled armatures subjected to the influence of the latter fields, the armatures of the receiver and transmitter being provided with windings, the windings of those armatures of the receiver and transmitter which are subjected to the influence of fields rotating in the same direction being electrically connected, substantially as described.

It witness whereof I hereunto subscribe my name this 3d day of February, A. D. 1899.

ADOLF FRANKE.

Witnesses:
WOLDEMAR HAUPT,
HENRY HASPER.